United States Patent [19]

Spencer

[11] Patent Number: 5,826,261
[45] Date of Patent: Oct. 20, 1998

[54] SYSTEM AND METHOD FOR QUERYING MULTIPLE, DISTRIBUTED DATABASES BY SELECTIVE SHARING OF LOCAL RELATIVE SIGNIFICANCE INFORMATION FOR TERMS RELATED TO THE QUERY

[76] Inventor: Graham Spencer, 10280 Lockwood Dr., Cupertino, Calif. 95014

[21] Appl. No.: 644,302

[22] Filed: May 10, 1996

[51] Int. Cl.[6] .................................................. G06F 17/30
[52] U.S. Cl. .................... 707/5; 707/1; 707/2; 707/3; 707/10
[58] Field of Search .................................. 707/5, 1, 2, 3, 707/10

[56] References Cited

U.S. PATENT DOCUMENTS

| | | | |
|---|---|---|---|
| 5,321,833 | 6/1994 | Chang et al. | 707/5 |
| 5,640,553 | 6/1997 | Schultz | 707/5 |
| 5,659,732 | 8/1997 | Kirsch | 707/5 |

OTHER PUBLICATIONS

K. Obraczka, et al., "Internet Resource Discovery Services", IEEE, pp. 8–22, Sep. 1993.

S. Al–Hawamdeh, et al., "Compound Document Processing System", IEEE, pp. 640–644, Sep. 1991.

B. Yuwono, et al., "Search and Ranking Algorithms for Locating Resources on the World Wide Web", IEEE, pp. 164–171, 1996.

P. Danzig, et al., "Distributed Indexing: A Scalable Mechanism for Distributed Information Retrieval", Proceedings of the 14th Annual International ACM/SIGIR Conference, pp. 220–229, Oct. 1991.

L. Gravano, et al., "The Effectiveness of GIOSS for the Text Database Discovery Problem", Proceedings of the 1994 ACM SIGMOD, pp. 126–137, Jun. 1994.

J.P. Callan, et al., "The Inquery Retrieval System", Proceedings of the 3rd International Conference on Database and Expert Systems Applications, pp. 78–83, 1992.

H. Turtle, et al., "A Comparison of Text Retrieval Models", The Computer Journal vol. 35/No. 3, pp. 279–290, Jun. 1992.

Salton, G., "A Blueprint for Automatic Indexing", ACM Special Interest Group on Information Retrieval, vol. XVI, No. 2, pp. 22–38, Fall 1981.

Kwok, K.L., "Query Modification and Expansion in a Network with Adaptive Architecture", ACM/SIGIR Proceedings of the 14th International Conference on Research & Development in Information Retrieval, pp. 192–201, 1991.

(List continued on next page.)

*Primary Examiner*—Thomas G. Black
*Assistant Examiner*—Donald Min
*Attorney, Agent, or Firm*—Fenwick & West LLP

[57] ABSTRACT

A system, method, and various software products provide improved information retrieval performance from multiple document databases by retrieving from the multiple document databases in response to a user query, a set of documents that globally satisfy the query, even though each database maintains independent document indices, term frequency information, and scoring functions. The global search result approximates, to any desired degree of error, the search results that would have been obtained had the multiple document databases been globally indexed. This is done by sharing at the time the query is executed, a small subset of information about the local relative significance of terms related to the user's query, and from this information, determining a global relative significance of such terms. From the global relative significance, the individual document databases determine their query results, which are then merged into a global set of documents satisfying the query. The shared local relative significance information may be the inverse document frequency of each of a number of terms related to the query, or it may be the total frequency of each of such terms. The global relative significance may correspondingly be a global inverse document frequency, or a global term frequency from which the global inverse document frequency is calculated.

38 Claims, 7 Drawing Sheets

OTHER PUBLICATIONS

Wilkinson, R. and Hingston, P., "Using the Cosine Measure in a Neural Network for Document Retrieval", ACM/SIGIR Proceedings of the 14th International Conference on Research & Development in Information Retrieval, pp. 202–210, 1991.

Simpson, P., "Query Processing in a Heterogeneous Retrieval Networks", 11th International Conference on Research & Development in Information Retrieval, pp. 359–370, 1988.

Korfhage, R.R., "To See, or Not to See—Is That the Query?", ACM/SIGIR Proceedings of the 14th International Conference on Research & Development in Information Retrieval, pp. 134–141, 1991.

SYSTEM AND METHOD FOR QUERYING MULTIPLE, DISTRIBUTED DATABASES BY SELECTIVE SHARING OF LOCAL RELATIVE SIGNIFICANCE INFORMATION FOR TERMS RELATED TO THE QUERY

BACKGROUND

1. Field of Invention

The present invention relates to systems and methods for computer based text retrieval, and more particularly, to systems and method for text or information retrieval from multiple, distributed databases.

2. Background of Invention

An ever increasing amount of information is becoming available electronically, particularly through wide-area networks such as the Internet. As the amount of available information increases, the importance of efficient and accurate search techniques also increases. The Internet and other wide area networks may be understood as having a number of distributed databases of documents, each separately and independently created, maintained, and updated. In handling a query to such a network of databases, the goal is to return to the user a set of documents retrieved from any of the distributed document databases that accurately satisfies the user's query. This process should be transparent to the user in that the user should not have to know where the documents are being retrieved from, nor should the user have to manually direct the query to the various databases.

However, information retrieval from multiple document databases is complicated by the fact that many retrieval algorithms rely on global information about all of the document databases. More particularly, many conventional retrieval systems rely on measures of the relative significance of terms within the document collection as a whole and within individual documents. These measures of local relative significance are based on frequency information about each of the unique words, or "terms" in the document collection. Most retrieval systems make use of two types of term frequency information: a within-document term frequency which reflects the frequency of occurrence of the term within a document, and a between-document measure that reflects the frequency of occurrence of the term within a document database. The between-document frequency measure is commonly known as inverse document frequency, or simply, "IDF," and there are numerous different formulas for determining the IDF of a term. A query is then processed by scoring each document in the document collection, including in the multiple databases, by some scoring function using the collected term frequency information for the terms in the query, along with other terms in the database. In such a system then all documents from all relevant distributed document databases must be commonly indexed before a query is handled so that the term frequency information for the entire document collection and for each document is known.

One typical solution to the problem of querying multiple, distributed document databases then is to try to collect the necessary information for as many of the distributed documents as possible at the host computer. Contemporary examples of this approach include "spider" computer programs used by various Internet search companies. Spiders automatically traverse the network and gather information about documents in the various document collections. This information is typically the text of the document and information sufficient to identify its location on the network. The information about the distributed documents is then indexed at the host computer to obtain the necessary term frequency information. Queries for documents are handled entirely at the host computer, which returns to the user references or links to the documents at their various network locations. This approach has several disadvantages. First, it consumes a tremendous amount of network resources, since all the text must be brought back to the host computer. Second, the information is necessarily less timely, since it requires a large amount of computational effort to extend or rebuild the files that are used to index the information. Finally, the approach is not scaleable—the proliferation of documents and other information accessible over wide-area networks will quickly outpace even the swiftly increasing capacity and computational speed of modern computers.

Clearly, a distributed solution is desirable, where the term frequency information about the multiple, distributed document databases is not consolidated at a single host computer. Accordingly, other conventional distributed retrieval techniques typically take one of two approaches: either they ignore collection-wide information altogether, or they try to design a protocol that can account for such information.

Systems that ignore collection-wide information are easy to implement since no attempt is made to index the multiple document databases into a single index. However, these systems typically perform poorly relative to standard information retrieval systems. This is because collection-wide term frequency information provides a dramatic improvement in terms of query quality, independent of whether or not the collection is distributed.

Distributed retrieval systems that do account for collection-wide term frequency information usually take one of two approaches. Some of these systems try to share a static subset of information between the various distributed document databases, for example, using a single, locally determined frequency information with all of the distributed document databases. This term frequency information is also shared prior to any query. This technique is impractical because in order to achieve good results, a fairly large fraction of each document database must be shared in order to obtain a statistically meaningful measure of term frequencies. If the document databases are large, such a technique will obviously have high bandwidth requirements, making it unsuitable for large collections of documents. Furthermore, term frequency information must be re-transmitted when a collection changes, since minor changes in term frequency for certain documents may significantly impact query results. This problem makes such a technique inappropriate for dynamic collections, as is commonly found on the Internet, where document collections change very frequently, and in many corporate networks. Thus, systems based on information-sharing between the multiple document databases themselves is not a suitable solution.

Other distributed retrieval systems rely on heuristics to approximate the effect of collection-wide term frequency information without actually attempting to gather such information. One disadvantage of such systems is that a training phase may be required; such a training phase in turn requires a well-known corpus and an external agent to evaluate the system's performance against the corpus. Systems that do not require training typically rely on a single scalar weight to account for differences between sub-collections. Each of these approaches injects its own biases and hence inaccuracies into the solution space, and further often face scalability problems.

Accordingly, it is desirable to provide an information retrieval method and system that produces globally accurate results to user's queries, without the need for the a priori collection of system wide term frequency information, and without the bandwidth, accuracy, and scalability problems of systems that do share predetermined frequency information.

SUMMARY OF THE INVENTION

In accordance with one aspect of the present invention, an information retrieval system, method, and various software products provide information retrieval from multiple document databases by selective sharing at the time of a query of information about the frequency of terms in the document databases. The present invention provides a theoretically sound method for achieving results from the multiple databases that are very similar to the results that would have been achieved if all the document databases had been aggregated into a single database. The present invention further provides control over the degree of accuracy of the search results. The present invention is very different from the static sharing technique mentioned above: rather than share a large amount of information in advance of any particular query, a small amount of information specific to each query is shared at the time of the query. The shared information is used to synchronize the multiple databases, which then perform the query and return the results.

In one embodiment, the present invention shares information about the local relative contribution that various terms would have on the results of a query within each of the document databases. This shared information describes the impact of variations in the between-document term frequency value, IDF, to the query in each of the databases. Many terms might have radically different IDF values from one document database to another. Each difference in IDF contributes to an overall error in the final computed document score. The present invention is based in part on the observation that the error contributed by an IDF difference will vary depending on the actual query; furthermore, for any given query there are only a few terms that will create a large error if their IDF values are different from one document database to another. It is precisely these terms whose IDF values should be synchronized.

As previously mentioned, conventional search systems process a query by scoring documents in the database according to term frequency information. Most such scoring functions are based on the between document term frequency, the IDF, of each term, the within-document term frequency TF, and a normalization factor k that normalizes these a document vector of term, frequency pairs, based on the length of the document vector. Such a scoring function may be:

$$S_D = \sum_q W_q * \frac{IDF_q TF_{D,q}}{k_D} \quad (1)$$

where $S_D$ is the document score for document D, q iterates over each term of the query, $W_q$ is a weight for term q, $IDF_Q$ is the IDF of term q in a given document database, $TF_{D,q}$ is the within-document frequency of term q in document D, and $k_D$ is the normalization factor for document D, typically the vector length of a document vector of term, within-document frequency pairs. $k_D$ is conventionally determined as:

$$k_D = \sqrt{\sum_i^T (IDF_i^2 TF_i^2)} \quad (2)$$

where i iterates over the term T in document D. $k_D$ may be determined in other ways, for example, without the squared IDF and TF terms, however, this results in non-normalized vectors. Since the within-document frequency TF is fixed for terms in a document, variations in the between document value, the IDF, for a given term have the most potential for influencing the document score. From (1) and (2) it can be seen that score of a document is determined not merely by the IDF of the query terms, but also by the IDF of terms not in the query, but in the document, due to the presence of the IDF in the normalization factor k. Again, because each different document database may have different IDF values for a given term, adjusting the IDF values for terms is desirable. However, because of the influence of non-query terms, merely passing IDF information between the multiple databases is too inefficient to provide useful or practical system implementations, because of the potentially large number (e.g. tens of thousands) of terms that may have IDF values that influence a single document score. It is desirable then to identify the terms for which IDF information is most usefully shared.

The present invention solves this problem by providing a computer implemented retrieval method for determining and selectively sharing information about the terms, both in the query, and external to the query, that are likely to contribute a significant error to the document score in one database relative to some other database if their IDF values are not synchronized, or made equal. In particular, these are the terms that have a high IDF value (and therefore low frequency) in one database, but low IDF (and high frequency) in the other databases. This variation in IDF values occurs in part because of the non-random distribution of documents across the databases.

For example, a document database storing a collection of mainly technical literature will likely have a high IDF value for a terms related to politics, such as "Congress", because of the infrequent appearance of such terms. However, in other databases, such as databases containing news publications, the term "Congress" is likely to have a much lower IDF. Because of the differences in IDF values, a query with the term "Congress" will result in significantly different documents in these databases. Moreover, a same document in each of the databases will likely have widely varying scores, being highly scored in the technical database, and lowly scored in the news database. But even more so, even if the term "Congress" is not in the query in the technical database, but does appear in a document that does have the query terms, the document score for that document may be significantly influenced by the term "Congress." This is because, as shown above in (1) and (2) the high IDF of "Congress" will impact the normalization factor k for the document. Each of these factors will influence the resulting documents returned from the query, with uneven results between document databases. The goal then is to obtain a more "correct" search result from the technical database (and other databases) that reflects the IDF of the term "Congress" (and any other term of possible significance) within the context of all of the document databases that are being searched at once.

Accordingly, the present invention provides a system and method that identifies terms, both included in the query and external to the query, that may significantly impact the results of the query when processed in a number of the multiple, distributed databases. The present invention does this in four main phases:

Query Analysis
Collection Synchronization
Query Execution
Results Merging

In a first phase of query analysis, the user's query is sent from a client computer to each of the multiple document databases. Each document database determines the terms related to the query (both in the query and external to the query) that are likely to contribute significant error to the document scores resulting from the query if their IDF values are left unsynchronized. The actual query terms are always included in this list; however as shown, if only the query terms were used, there would still be potential for significant error in the document scores. Accordingly, additional terms are identified on the basis of their contribution to the normalization factor k of documents that rank highly in response to the user's query.

More particularly, during query analysis, each document database determines from a selected number of documents, a first list of terms T based on an error contribution weight $E_T$ for each of the first list of terms, where $E_T$ is:

$$E_T = W_T \sum_D \frac{IDF_T TF_{D,T}}{k_D} \quad (3)$$

where D iterates over the selected documents. The resulting error contribution weights describe the local relative contribution of the first list of terms to document scores in that database based on the user's original query. The documents from which the error contribution weights are determined are preferably selected by the document database by locally executing the user's original query, and selecting a certain number of resulting documents, such as the first n documents based on ranked document scores. The number n can be predetermined, or adaptively determined based on input from the client computer. Alternatively, a predetermined or adaptively determined percentage of the ranked documents may be selected.

As a result of this query analysis, the client computer receives from each of the document databases the first list of terms, along with their error contribution weights.

In the second phase of collection synchronization, the client aggregates terms it receives from the multiple document databases that could contribute significant errors and ranks them on the basis of their error contribution weights. The client computer then truncates this list to a manageable length based on various adaptive or predetermined criteria. This list now contains the significant terms for actually querying the multiple databases. The list of significant terms may contain some or all of the query terms, and some number of terms external to the original query.

The client obtains from each document database information about the local relative significance of each of the significant terms and determines a global relative significance of each term with respect to all of the databases. This information about the global relative significance is then shared during the fourth stage of query processing.

In one embodiment of the present invention, the local relative significance information of a term is that document database's IDF values for the term. This information is shared, or passed from each of the document databases to the client. With the IDF values for the significant terms from the document databases, the client determines a global relative significance of the terms. This is preferably done by determining a global IDF value for each significant term. The global IDF value of each significant term correctly reflects the actual IDF value for the significant term as if all of the document databases were combined into a single document collection.

Alternatively, the local relative significance of a term in a document database is the total term frequency of the term in that document database. This information for each of the significant terms is provided to the client by each of the document databases, along with the total number of documents in each database. The client computes a global relative significance of each term as the global frequency of the term in all of the databases.

In the third phase of query execution, the client instructs each document database to execute the query using the newly determined global relative significance information. In the first embodiment, the client passes in the computed global IDFs. In the second embodiment, the client passes in the global frequency information, in which case the databases themselves determine the global IDFs.

In either embodiment, during query execution each document database temporarily replaces its own local IDF values with the global IDF values, and then performs the query. In order to accurately perform the query with global IDF values, each document database renormalizes the document vector for every document that contains selected terms having updated, global IDFs. These documents are preferably documents containing terms of the query that have the updated, global IDFs. Each document database produces from the query a ranked list of documents that satisfy the query, given the global IDFs. This ranked list is sent back to the client computer.

In the fourth phase, the client has a list of ranked results from each document database. The client merges these lists and re-ranks the results without further computation to produce a list of documents that globally satisfy the query. This is possible because the combined are sufficiently close to the results that would have been obtained for the aggregate collection. The client is assured that the combined list of documents accurately represents, within a known margin of error, the query results that would have been obtained had the multiple document databases been combined in fact, and the IDFs of all terms determined with respect to all of the documents. The client then displays the document list to the user.

In another mode of operation of the present invention, the phases of query analysis is optional, with the client internally determining the selected, significant terms that are to be synchronized and obtaining the local relative significance information for these terms in either of the manners described. Query processing is performed as described.

The present invention may be embodied in various forms. In one embodiment, the present invention comprises a system of multiple, document databases and database computers, and at least one client computer that communicates with the document databases in the manner described above. In this embodiment, each of the document databases supports the present invention through the use of an application programming interface in a database management system of a database computer. The client computer uses the application programming interface to request and obtain the desired information, and to send queries to the database. The application programming interface includes an analyze method that receives the user query to the database, preferably as a set of term, weight pairs, and that sends back from the database, the first list of terms, and error contribution weights. The application programming interface further includes a synchronize method that receives a list of terms from the client and sends back the local relative significance information for the terms, either the IDF values for the terms, or the total frequency of the terms in the document database. The application programming interface finally includes a retrieve method that receives a query comprising a number of terms, global relative significance information for the terms, either global IDFs or global term frequencies, in which latter case the retrieve method calculates the global IDFs as needed. The database executes the query using the global IDF values, and returns the ranked list of documents to the client. So long as a document database supports the application programming interface, it may be organized internally in any manner, and may compute document scores using any of a variety of scoring algorithms.

The present invention provides numerous advantages over conventional distributed information retrieval systems. Most importantly, the results obtained in the final step are theoretically valid. Depending on how many terms are exchanged by the client and the multiple document databases, the total error can be reduced to any given tolerance.

Another advantage of the present invention is that each document database is independent of all the others. This means that each document database may be administered separately and updated on its own schedule, without any need for updating a centralized host. This makes the present invention particularly well suited for wide area networks such as the Internet, or large scale corporate intranets, where numerous different document databases may exist, each controlled and operated by different individuals or groups, having no central coordination.

Furthermore, a document database does not require information of the overall topology or composition of other databases. Each database communicates only with the client. This simplifies the design of the communication architecture for the system. In addition, because the databases are independent, the present invention allows new databases of documents to be added to the system at any time, without requiring any change or updating to the other databases.

DETAILED DESCRIPTION OF THE INVENTION

System Architecture

Figure 1:
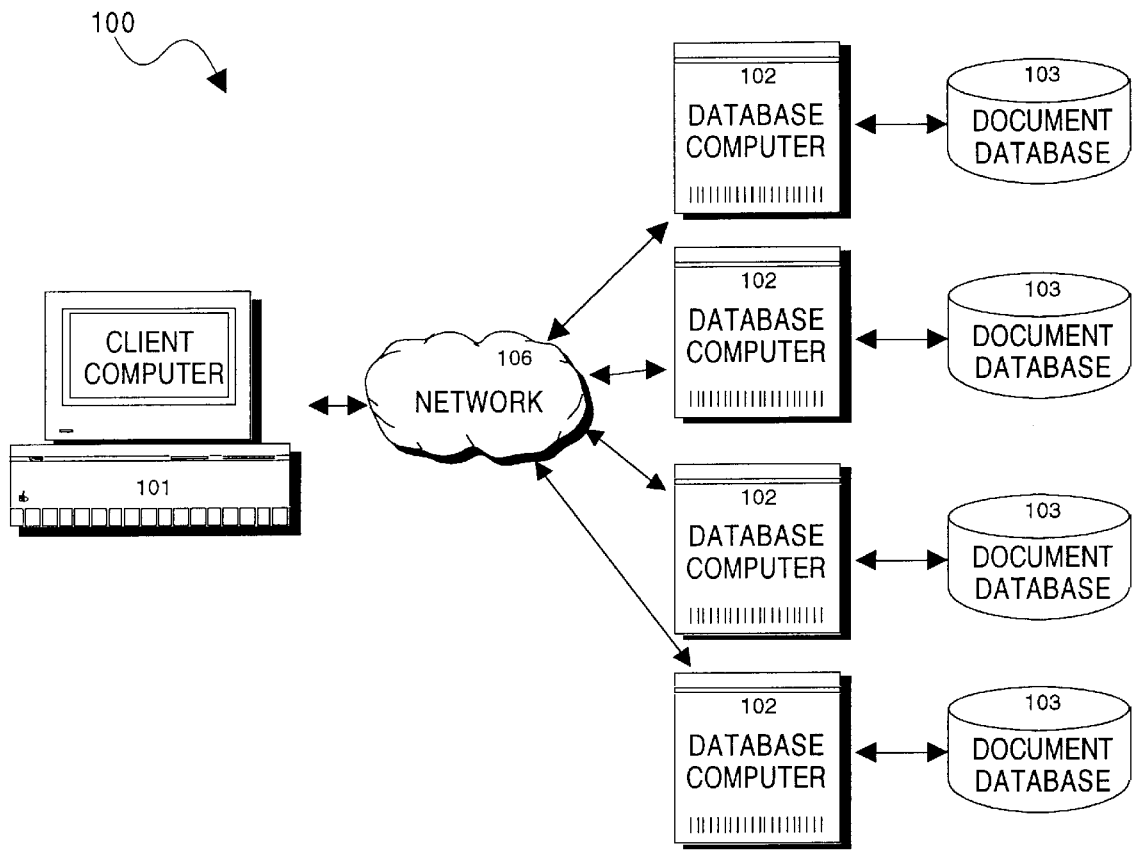
FIG. 1 is an illustration of a distributed information retrieval system in accordance with the present invention.

Referring now to FIG. 1, there is shown the architecture of one embodiment of a distribution information retrieval system with multiple document databases in accordance with the present invention. In system 100, there is at least one client computer 101 (or "client"), and any number of database computers 102, communicatively coupled over a network 106, preferably the Internet, or other similar wide area networks, or even local area networks, as the actual network architecture is not material to the present invention. Each database computer 102 is coupled to and controls a document database 103. In this embodiment, a client computer 101 is of conventional design, and includes a processor, an addressable memory, a display, a local hard disk (though diskless computers may also be suitably used), input/output ports, and a network interface. The display is of conventional design, preferably color bitmapped, and provides output for a graphical user interface for various applications. The input/output ports support input devices, such as a keyboard, mouse, and the like, for inputting commands and data in the system. The client computer 101 executes a conventional operating system. The network interface and network provides access to remotely situated mass storage devices, along with access to the Internet, with a TCP-IP type connection, or to other network embodiments, such as a WAN, LAN, MAN or the like. In the preferred embodiment the client computer 101 may be implemented on an Intel-based computer operating under Microsoft Windows® operating system, or equivalent devices.

A client computer 101 executes some form of client application that interfaces with the database computer 102 to provide user queries thereto and to receive documents satisfying such queries therefrom, and display such documents to the user. In the preferred embodiment where the database computers are distributed over the Internet and World Wide Web, the client application is adapted for communication via the Hypertext Transfer Protocol, and further adapted for decoding and displaying HTML documents. The client application may be a database frontend, a World Wide Web browser, or other similar applications, executing conventionally in the local memory of the client computer 101. It is anticipated that in one preferred embodiment, the client computer 101 may be a personal computer as used by an end user, whether in their home or place of employment, in order to access documents and information stored in the document databases 103 distributed on the Internet or other network. In another preferred embodiment, a user uses a third computer that communicates with the client computer 101. This third computer is merely used to pass the user's queries to the client computer 101, and receive back from the client computer 101 formatted search results.

In terms of hardware architecture, the database computers 102 are conventional server type computers, preferably supporting a relatively large number of multiple clients simultaneously for handling search and document requests, and other processing operations. The database computers 102 provide one or more conventional processors, and a suitable amount of RAM, preferably on the order of 18–64 Mb. The database computers 102 may be implemented with Intel-based personal computers, or other more powerful processors, such as various models of Sun Microsystems' SparcStations, operating under their UNIX implementation.

Figure 5:
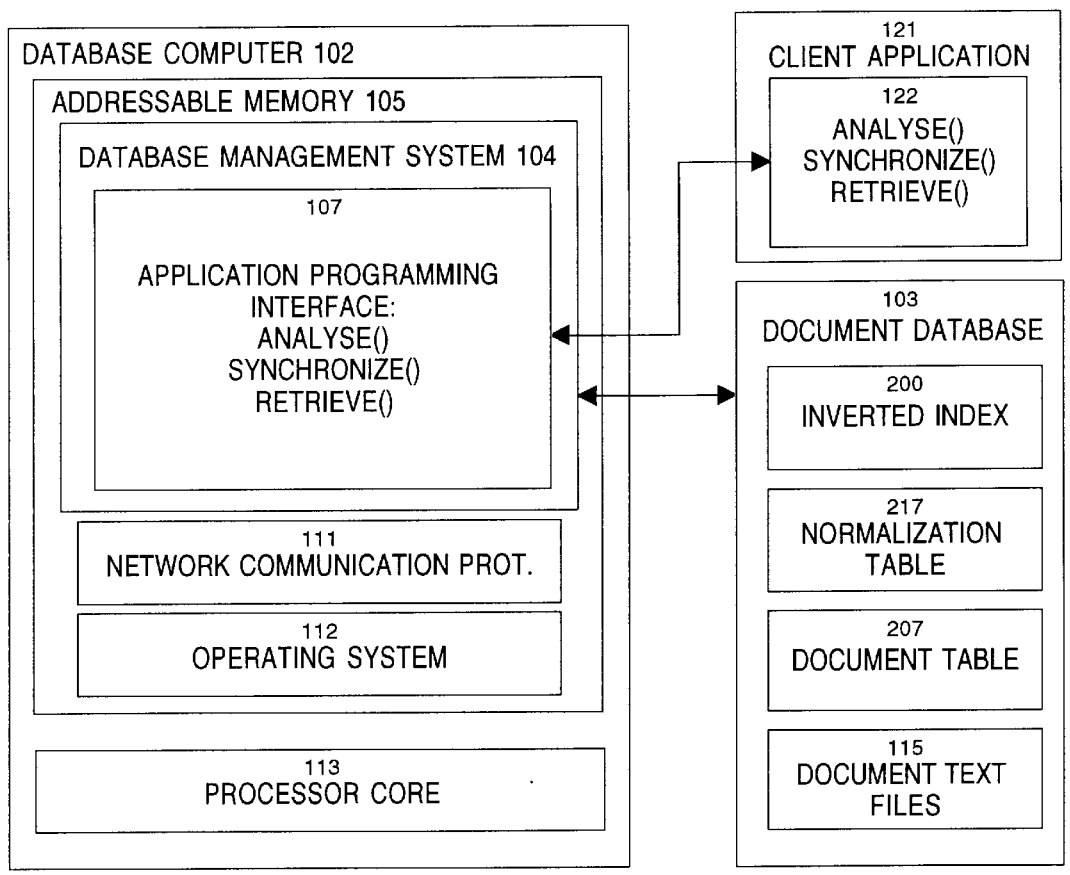
FIG. 5 is an illustration of the software architecture of a database computer and document database in accordance with the present invention.

Referring to FIG. 5, in terms of software architecture, in accordance with the present invention, each document computer 102 comprises a database management system 104, having an application programming interface 107 for defining and manipulating the document database 103. In accordance with the present invention, the application programming interface 107 enables client applications 121 on client computers 101 to request the services described herein for analyzing queries, synchronizing terms, and retrieving documents according to a supplied query and set of global IDF values. The application programming interface 107 is further described below. Such client applications 121, of whatever type, hold the interfaces (122) to the database management system 104. The database computer 102 further includes a network communication protocol 111 for handing communication with multiple client computers 101. A conventional operating system 112 is also present. These software elements operate conventionally in the addressable memory 105 of the database computer 102. Those of skill in the art will appreciate that the database management system 104 with an application programming interface 107 supporting the present invention may be provided to the database computer 102 as a software product on computer readable media, such as CD-ROM, 8 mm magnetic tape, or the like for installation and execution thereon.

In order to participate in the distributed information retrieval system 100, the database management system must be able to respond to several different messages from the client computer 101. The request and response can be implemented in several different ways:

In the typical case where document databases 101 are managed by servers, such as the database management systems 104 of the database computers 102 (which could reside on the same machine as the client), some form of interprocess communication (IPC) is used to implement the protocol. An acceptable implementation is TCP, which provides reliability. However, TCP also has a setup cost, and since the communication protocol is preferably stateless, a stateless network protocol like UDP may also be used. Because reliability is not inherent to UDP, a client computer 101 could simply resend its request if it goes unanswered by a particular database management system 104. If many retries are expected, the database management systems 104 could improve performance by caching their responses for a limited amount of time. In general, any type of underlying IPC protocol may be employed to exchange distributed messages between the client computer 101 and the database computers 102.

If the document databases 103 reside on a local or remotely accessible file system, then the document databases 103 may be "passive", in that they do not require a server in order to participate in the communication protocol. Instead, the client computer 101 can use local function calls and direct reads and writes to the file system in order to extract the information in needs from each document database 103. In this case, the client computer 101 is still performing function calls that match the distributed protocol, but no IPC is necessary.

The document database 103 coupled to a database computer 102 may have any useful internal architecture or schema, and operate with various search engines in the database management system 104. The document database 103 preferably accommodates anywhere from several thousand to hundreds of thousands of documents, providing persistent storage thereof in a set of document text files 115. The document databases 103 are preferably conventional file systems, though relational, object oriented, or network database architectures may also be used.

In accordance with the present invention, each of the document databases 103 may be constructed and maintained independently of any of the other database 103. That is, no central coordination of the databases 103 is needed, whether for defining the specific schemas of the databases, their method for document representation, or their general search or document scoring algorithms. Each database computer 102 and database 103 can provide any public or proprietary scoring algorithm or document representation, so long as the necessary analysis, synchronization, and retrieval operations are supported. This flexibility of the present invention enables it to operate with multiple, heterogeneous, distributed, document databases 103 that are controlled by numerous third parties.

More particularly, each database 103 may employ any of a variety of document representation techniques. Generally, document representation in accordance with the present invention includes the use of document vectors. A document vector may be constructed as a set of (term, frequency) pairs. In addition, a document is associated with its full text. In some embodiments, the actual document vector may be created and stored for the document. In other embodiments, the document vector may be created as needed during the execution of a query.

In one preferred embodiment, at least one of the document databases 103 persistently maintains an inverted index 200, a contribution table 207, and a normalization table 217. These elements are preferably persistently stored in the storage media of the database 103, such as hard disk, optical disk, or the like. During operation, all or selected portions of these elements may be usefully copied into the addressable memory 105 of the database computer 102 for improved performance.

Figure 2:
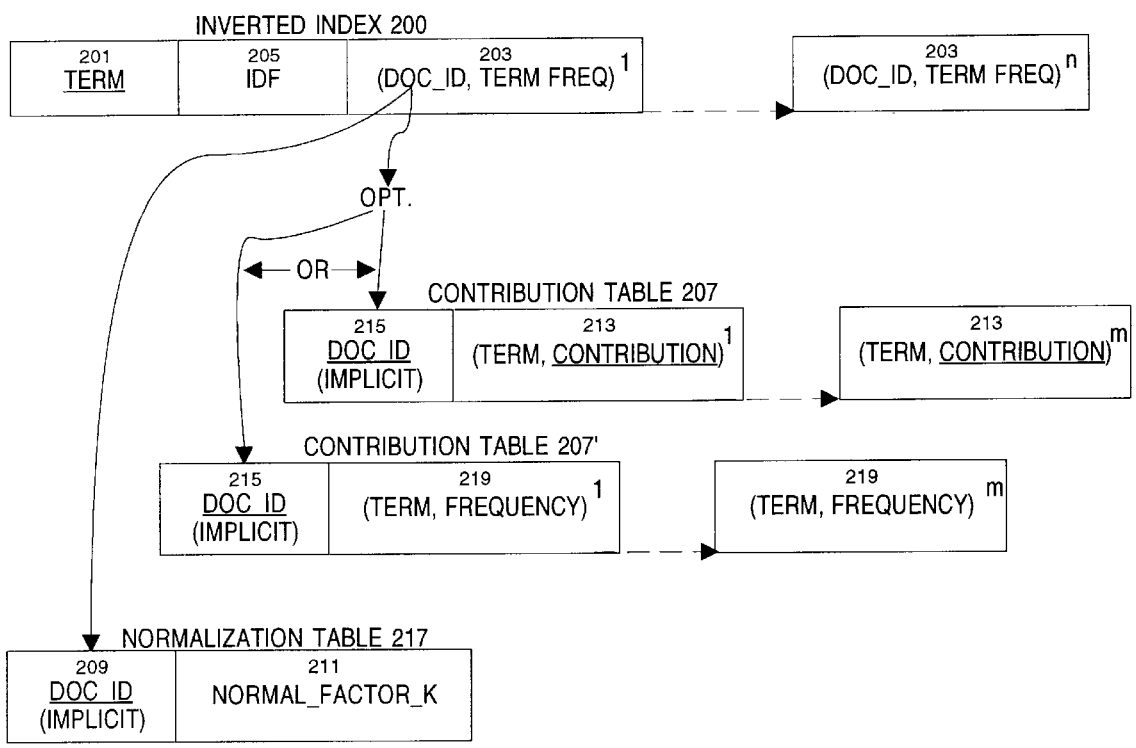
FIG. 2 is an illustration of useful data structures for organizing document databases for use with the present invention.

FIG. 2 illustrates one embodiment of these elements as may be used with the present invention. Inverted index 200 includes an ordered (typically alphabetically) table of terms 201, each term being one of the unique terms in the database 103. As appreciated by those of skill in the art, each database 103 will likely have a distinct inverted index 200 as terms appearing in one database 103 may not appear in some other database 103.

Each term 201 is associated with at least one, typically many (here n), references to (document id, term frequency) pairs 203. The document id uniquely identifies a document in the database 103. The term frequency describes the number of occurrences of the term in the document.

In accordance with the present invention, each term 201 has an associated inverse document frequency (IDF) 205 which is one measure of the local relative significance of the term in the database 103. The IDF of a term 201 may be computed in any of a variety of manners, the particular implementation of which is not limited by the present invention. One simple and useful definition of the IDF of a document T is:

$$IDF_T = \log\left(\frac{N}{n_T}\right) \quad (4)$$

where N is the number of documents in the database 103, and $n_T$ is the number of documents in the database 103 that contain at least one occurrence of term T. Other more complex definitions of IDF may be used with the present invention. Likewise, other measures of the local relative significance of terms may also be used. Further, different databases 103 within the system 100 may each use a different definition of a document's IDF: the present invention still enables querying of the multiple document databases 103 to produce a theoretically complete and accurate set of results. In this case, where the different databases 103 use different formulas for IDF, the underlying frequency data used to compute the IDFs is shared with database computers 102, instead of the IDFs themselves. The ability to query multiple document databases 103 that are independently constructed, and that use different search algorithms, different document vector definitions, and different IDF definitions has previously been unavailable.

The inverted index 200 is preferably stored in some compressed format, using techniques such as differential encoding, or the like. The IDF is stored in a fixed point format, though floating point representations may also be used.

It should be further noted that while an inverted index 200 is useful and improves the efficiency of the present invention, such is not required. Nor does the IDF value of a term have to be predetermined. Rather, it is compatible with the present invention, though considerably less efficient, to perform simple full text searches on the documents and compute term IDF values at runtime. Again, the present invention support such flexibility in the implementation of the databases 103 and database computers 102.

Returning to FIG. 2, in databases 103 where an inverted index 200 is deployed, it is further desirable, but again, not necessary, to include an ordered normalization table 217, providing a normalization factor k (211) for a document vector for each document in the database 103. The normalization factor k may be determined in any of a variety of manners. Preferably, the normalization factor k is determined as the vector length of the document vector. The document id 209 here is implicit, based on the index value in the table.

Finally, in a preferred embodiment, retrieval performance may be further enhanced by optionally storing a contribution table that speeds up the process of computing the individual significance of terms in a document to the score of the document. Two variations of the contribution table, (207 and 207') are illustrated in FIG. 2.

In one variation, contribution table 207 contains for each document in the database 103 a set containing a selected number m of (term, contribution) pairs 213. The sets are ordered by document id for rapid access. In each set, the (term, contribution) pairs 213 are ordered in descending order of the contribution amount. The contribution $c_{T,D}$ of a term T to document D may be determined as:

$$C_{T,D} = \frac{IDF_T TF_{D,T}}{k_D} \quad (5)$$

where $TF_{D,T}$ is a frequency of the term T in document D, $IDF_T$ is an inverse document frequency of the term T in the database 103 storing the document D, and $k_D$ is a normalization factor for document D, typically the length of the vector represented by the document. Since the contribution $c_{T,D}$ is a factor of the document scoring function, these pairs 213 are useful because it allows the search and scoring functions to rapidly identify the terms that most significantly influence, or contribute, to a document score for the identified document.

Preferably these pairs 213 are not stored for all terms in the document, but rather for a predetermined, fixed number of terms with the greatest contribution values, c, or alternatively, a predetermined percentage of the top terms.

The (term, contribution) pairs 213 are preferably created for each document at the time the document is initially processed and entered into the document database 103. Generally, the text of a document is iterated over, the unique terms in the document identified, along with their within-document frequencies, TF. The inverted index 200 is updated, along the IDFs of each of the terms, and the normalization factor k for the document computed and added to table 217. The contribution c of the terms is then determined and ranked, and the top m terms are selected and stored in the contribution table 207. In the preferred embodiment, the 32 terms with the largest contribution values are stored, ordered by contribution.

In a second variation, instead of storing in the contribution table 207 the contribution of each term, the frequency of the term is stored, as illustrated in contribution table 207'. Here, the pairs 219 include (term, frequency) data. Still, the pairs 219 are arranged in order of descending contribution, by first computing the contribution value for the term in the document, but only storing the term frequency data in the table 207'. From this information, the contribution of each term in a document may be rapidly calculated at query time by looking up the IDF 205 for the term in the inverted index 200 and the normalization factor k for the document in normalization table 217. This implementation provides for enhanced compression of the contribution table 207 since the frequency data is an integral scalar value.

The document vector of each document itself may, but need not be, stored with the document, as it may be computed on demand from the inverted index 200 and the normalization table 217. If the document vector is stored it may be stored in compressed (e.g. terms with 0 frequency dropped, or differential frequency encoding) or uncompressed form, as desired for efficiency and performance.

Finally, it is clear to those of skill in the art that the system 100 as illustrated and described is merely an instance of one aspect of the invention. Other embodiments may also be fashioned in accordance with the present invention.

System Operation

Figure 3:
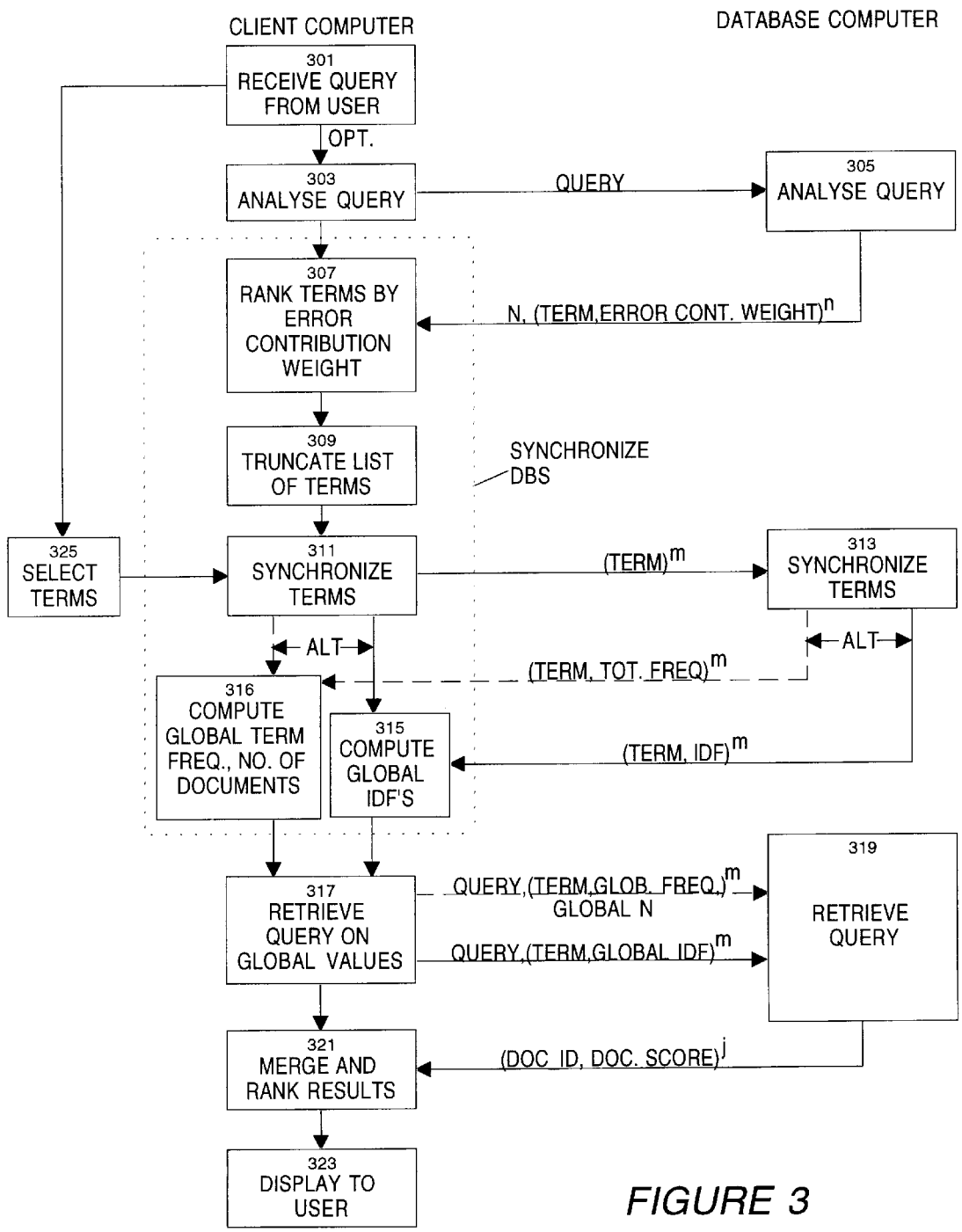
FIG. 3 is a flowgraph of the overall operation of the present invention.

Referring now to FIG. 3, there is shown a flowgraph of the overall operation of the present invention, showing the interaction between, and the processes of, both the client computer 101 and one of the database computers 101. While illustrated for a single database computer 101 for clarity of explanation, the client computer 101 interfaces with any of a number of database computer 102 as it determines to be necessary in a more or less pseudo-simultaneous, yet asynchronous manner. Further, any of the database computers 102 may act as a router to the other database computer 102 for processing of queries in accordance with the present invention.

The present invention may be used in a variety of different manners. The preferred manner of operation will first be described.

In this mode of operation, the client computer 101 receives 301 a query input by the user. The query is preferably in the form of a free text expression. In addition, other types of query expressions may be used, such as Boolean expressions, field delimited data, such as date range restrictions, title or author restrictions, and the like. Any combination of these or other query types may be used. In addition, each term (or set of terms) in a query may have a user defined weight W indicating the significance of the term to the query as far as the user is concerned. If no weight is assigned by the user, then all terms given a weight of 1, or alternatively, are given normalized weights so that the combined weight of all terms of the query is 1.

The client computer 101 then analyses 303 the query by sending the query to each of the database computers 102. In the preferred embodiment, this is done by invoking, as part of the database computer's 102 application programming interface of its database management system 104, an analyze( ) method. In accordance with an implementation of the present invention, the analyze( ) method takes as inputs the query as a set of terms and if necessary, term weights, operators or other delimiters or parameters. The analyze( ) method returns to the client computer 101 a first list of terms T along with respective error contribution weights $E_T$ for the terms. These terms are the terms that are likely to significantly impact the results of the query if the IDFs of the terms are not synchronized between the different document databases 103. The error contribution weights $E_T$ are a measure of the relative amount of impact each term has on the document scores for documents locally satisfying the query in the database 103. Preferably, the error contribution weight $E_T$ for term T is determined according to the equation:

$$E_T = W_T \sum_D C_{T,D} \quad (6)$$

where $W_T$ is a weight of the term, D iterates over a selected set of documents in the database 103 receiving the user's query, and $c_{T,D}$ is the term's contribution to the document, as described above. The error contribution weight may thus be easily determined at runtime from the (document, contribution) pairs 213 in the contribution table 207. Terms T are ranked by their error contribution weights $E_T$, and some subset of these are selected as the first list of terms. In embodiments where the contribution table 207 is not used, the value of $c_{T,D}$ is simply computed as needed, without being looked up.

The selection of documents D for performing the above analysis and determination of terms T may be determined in a variety of manners. Preferably, the documents are selected by first executing the user's query on the document database 103, scoring and ranking the returned set of documents, and selecting some number of these documents as documents D.

The analyze( ) method preferably also returns N, the total number of documents in the database 103 of the database computer 102. This later enables the client computer 101 to determine the global IDF values for various terms that are to be synchronized. The preferred embodiment incorporates this information in the return of the analyze( ) merely for convenience. Those of skill in the art realize that the information for N may be requested and obtained by a completely separate method other than the analyze( ) method.

Figure 4:
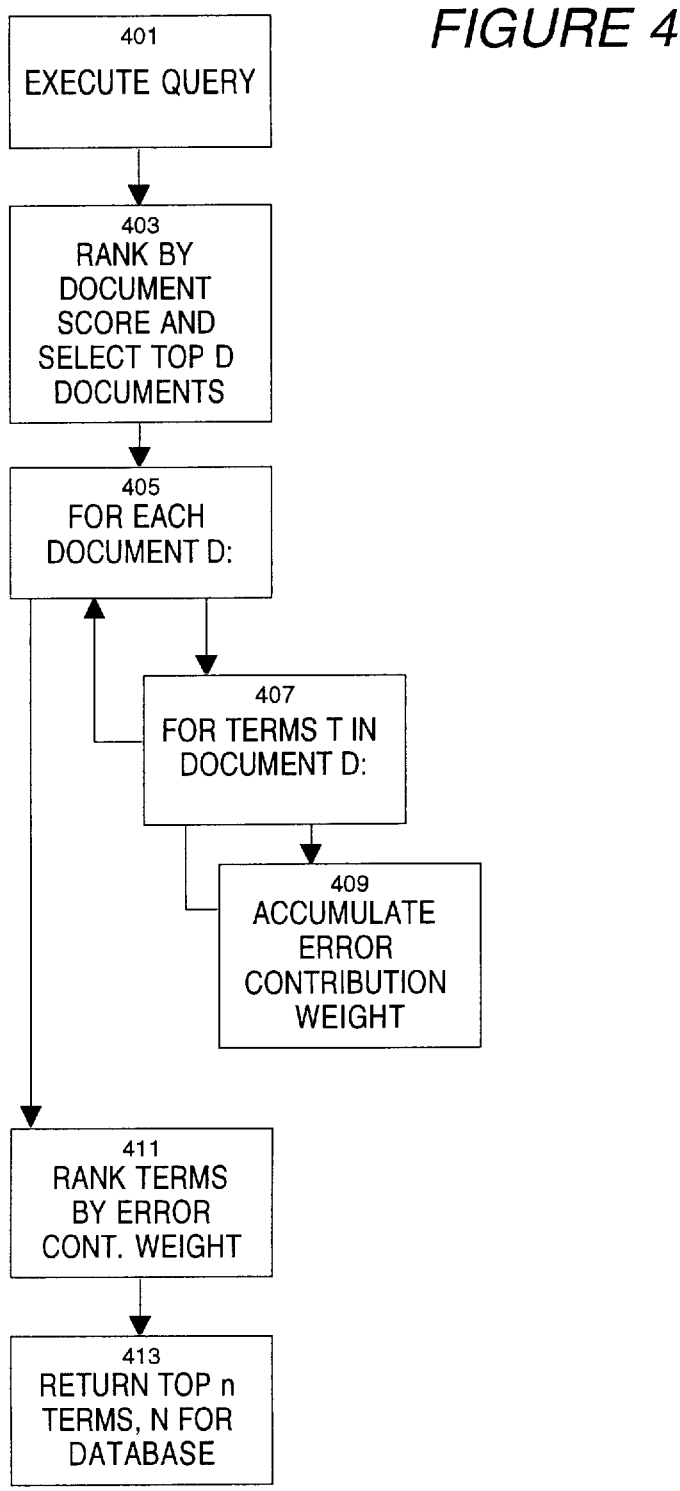
FIG. 4 is a flowchart of the process of analyzing documents.

The actual implementation of the analyze( ) method may be achieved in a variety of different ways. Referring now to FIG. 4 there is shown one embodiment of the analyze( ) method in accordance with the present invention. As stated above, the client passes into each database computer 102 by its analyze( ) method the user's query, along with any weights W on the terms of the query, other parameters, delimiters and the like. The database computer 102 executes 401 the query to identify a set of documents that locally satisfy the query. In executing the query, the database computer 103 performs any necessary and internally defined query parsing, query optimization, and document scoring.

In a preferred embodiment where the document databases 103 include the inverted index 200 described above with respect to FIG. 2, documents may be selected by hashing to the query terms in the inverted index 200, resolving any Boolean operations or other restrictions, and traversing the document ids and scoring the documents referenced therein. A simple scoring function such as:

$$S_D = \sum_q W_q * \frac{IDF_q TF_{D,q}}{k_D} \quad (7)$$

may be used, as described above. Many other scoring functions may be used. It is a feature of the present invention that the multiple database computers 102 may use any public or proprietary document scoring function when executing 401 the query to identify this set of documents satisfying the query.

Once the query is executed and the documents scored, the documents are ranked 403 by their document scores and a number D of documents is selected. The number D of selected documents may be constant, such as the top 10 documents, or it may be determined as a percentage, such as the top 10% of the returned documents. Alternatively, the documents D, may be selected as only those with document score (raw or normalized over the returned set) greater than a predetermined or adaptively determined threshold amount. Other variations for scoring and selecting the D documents will be apparent to those of skill in the art.

From the selected documents D, the analyze( ) method then traverses 405 over each of the documents D. For each document D, the method traverses 407 over the terms T of the document D, and accumulates 409, the error contribution weight $E_T$ of the term T. In one embodiment, where a contribution table 207 stores the document vector 210, iteration through the document vector 210, and indexing to the IDF (205) of the term T (201) will enable determination of the $E_T$ of the term T.

In a preferred embodiment that uses the contribution table 207 with (term, contribution) pairs 213 for significant terms, the speed of this step of the analyze( ) method is significantly improved. The analyze( ) method need only traverse over the terms T in the table 207, and compute the $E_T$ of these terms from the predetermined contribution $C_{T,D}$ stored therein (or alternatively, in contribution table 207', directly from the term frequency, IDF in the inverted index 200 and normalization factor k from normalization table 217). In either case, since this set of terms has previously been determined to be the terms with the largest contribution values in the document, these are the terms that are most likely to significantly impact the query, as previously explained above, because of their influence directly on the document score or indirectly, by altering the normalization factor k of the document. Traversing 407 the terms T in contribution table 207 (or 207') always takes less time that traversing all of the terms in the document. Thus considerable performance gains are achieved when the present invention is used with the contribution table 207.

In either case, whether all or some of the terms of a document are analyzed 407, the result will be a set of terms, from all of the documents D, with error contribution weight E summed over the documents D. The analyze( ) method then ranks 411 the terms by their error contribution weight E.

The analyze( ) method then selects 413 the top n terms by error contribution weight E. Again, these may be selected as either a fixed number of terms, and predetermined or adaptively determined percentage, or a based on threshold error contribution weight E. The selected terms are returned along with N, the total number of documents in the database 103.

Again, it should be noted that in the context of FIG. 4, this method is carried out by a single database computer 102 on its document database 103. In the context of FIG. 3, the method is carried out by a number of database computers 102, as requested by the client computer 101. The client computer 101 will therefore receive from the numerous database computers 102 a first list of terms and error contribution weights, along with N, the total number of documents in each of the databases 103.

The client computer 101 then begins the process of synchronizing the multiple document databases 103. The client computer 101 ranks 307 all of the received terms from the various database computers 102 by the error contribution weights of the terms. Where the client computer 101 receives for a single term error contribution weights from multiple database computers 102, these multiple weights are summed before ranking the term. This informs the client computer 101 of which terms, over the entire collection of document amongst all of the databases 103 most significantly impact the overall results of the query.

While all of the terms received from the database computers 102 could theoretically be synchronized, in practice, this is neither efficient nor necessary. Rather, in one preferred embodiment, the client computer 101 truncates 309 the ranked list of terms to a number m of terms (m here is unrelated to the number of terms in the contribution table 207). The truncation may select a predetermined or adaptively determined number of terms, such as the top 10 or 20 terms, or a predetermined or adaptively determined percentage, such as the top 10% of the terms. Alternatively, some number of terms may be selected in proportion to the amount of error that is acceptable in accuracy of the query. The amount of error may be specified by the user at the time the query is entered. A relatively low error threshold means that a relatively larger number of terms are selected 309 for synchronization. A relatively high error threshold means that a relatively low number of terms are selected 309. The resulting set of documents from the query will be assured to be accurate to a known degree of error.

Once the terms are selected by truncation 309, the client computer 101 invokes 311 the synchronize( ) method of each database computer 102, passing in the m selected terms.

There are two distinct implementations for synchronizing 313 the terms in accordance with the present invention that ultimately produce the same result to the user. In one embodiment, the synchronize( ) method of the database computer 102 looks up each of the m terms in the inverted index 200 of the database 103, and, determines the IDF 205 value stored therein for the term. The m (term, IDF) pairs are then returned back to the client computer 101. This path is shown in FIG. 3 as the solid line from synchronize 313 with the m (term, IDF) pairs. Again, the IDFs of these terms for given database 103 is an expression of the local relative significance of the terms to the query within the database 103.

The client computer 101 then computes 315 the global relative significance of the terms from their local relative significance in each of the databases. In one embodiment, the global relative significance is measured by an inverse document frequency value with respect to all of the document databases 103. This global IDF, $G_T$, may be computed for an individual term T as:

$$G_T = \log\left(\frac{\sum_i N_i}{\sum_i n_{i,T}}\right) \quad (8)$$

where $N_i$ is the number of documents in each database i, and $n_{i,T}$ is the number of documents in database i that contain term T. This computation is repeated for each of the m selected terms. The resulting set of synchronized terms approximates, with a known margin of error, the IDFs the terms would have had if the multiple document databases 103 were combined.

Using this implementation of synchronization 313, the client computer 101 then executes 317 the user's query to retrieve documents from all of the databases 103 that globally satisfy the user's query. This is done by invoking a retrieve( ) method of the application programming interface 107 of each database computer 102, passing in the user's original query, along with the set of m terms and their new global relative significance in the form of the global IDF values just computed.

In the second implementation for synchronization 313, the database computer 102 determines for each of the m terms the total frequency $TF_{Tot\_t}$ of the term in the database 103, and returns these m pairs of (term, total frequency) data to the client computer 101, as shown by the dashed line from synchronize 313 in FIG. 3. With this information the client computer 101 does not compute 315 the global IDF for the selected terms. Rather, the client computer 101 can synchronize the databases by computing 316 for each term a global term frequency $TF_{Global\_T}$, as the sum of the total term frequencies $TF_{Tot\_T}$ in all of the databases 103, and a global database size $N_G$ as the sum of the number $N_i$, of documents in all of the databases 103.

In this embodiment, client computer 101 then executes 317 the user's query to retrieve documents from all of the databases 103 that globally satisfy the user's query, this time by invoking the retrieve( ) method and passing the set of m terms, and the global relative significance thereof in the form of the global term frequencies $TF_{Global\_T}$ for each term, and the global database size $N_G$.

In either embodiment, each database computer 102 executes 319 its retrieve method by processing the query against the database. Where the database computer 102 receives the global IDFs themselves, it substitutes the global IDFs for the local IDFs of the terms, and renormalizes the normalization factor of the documents if necessary. Where the database computer 102 receives the global term frequencies, it computes the global IDFs, as above, and substitutes them as needed during querying processing.

More particularly, the retrieve( ) method operates as follows in one embodiment. The retrieve( ) is preferably based on a parallel unpack method of query processing that processes each term of the query in the rows of the inverted index 200 in parallel, iteratively traversing the rows, and scoring each document therein for as many terms that match as possible. The standard parallel unpack process may be expressed as:

1. Initialize a row index in the inverted index for each term of the query, for traversing the (document id, term frequency) pairs in the row.
2. Calculate a document score for the document with the minimum document id that is found in one or more term rows, based on current normalization factor k for the document, and the IDFs of those terms.
3. Increment the row indices in the rows having the minimum document id(s).
4. Repeat (2) and (3) until all rows are traversed.

This otherwise conventional technique is modified to recompute the normalization factor k of a document for those terms of the query for which there is a new global IDF, and then determine the document score based on the IDFs (global or local) of the terms of the query. One means of doing this is as follows:

2.1. OPT: For each term m, compute global IDF from global term frequency, global database size.
2.2. Retrieve current normalization factor k for the document from the normalization table 217, and square it to produce $k^2$.
2.3. For each of the terms in the query for which there is a new global IDF:
2.4. Square the local IDF of the term, and term frequency TF of the term, and compute the product of these values.
2.5. Subtract the product from $k^2$ to produce k'.
2.6. Sum the squared value of global IDF to the current value of k'.
2.7. Take the square root of k' to produce a new normalization factor k.
2.8. Compute document score from the IDFs of the query terms, and the new normalization factor k.

Step 2.1 is used only where the database computer 102 receives the global term frequency information instead of the global IDFs from the client computer 101.

In this implementation, step 2.3 is limited to just those terms of the query for which there is a new global IDF (whether received from the client computer 101, or calculated by the database computer 102 from total term frequency information), and not for all terms, whether in the query or not, for which there is a new global IDF. This is because for the scoring function typically used, as set forth in (7), if a document does not contain any terms of the query, then its document score is 0, and thus there is no need to recompute the normalization factor k of the document, even if other terms of the document have a new global IDF. In other embodiments where the scoring function does not produce a 0 document score where the document does not include any terms of the query, then step 2.2 would not be limited in this manner. Rather, there would be a traversal of all terms that have global IDFs and an updating of the normalization factor k of documents containing such terms.

To aid in the management of the document scores, the retrieve( ) method maintains a ranked set of some number j, such as 20, of the top document scores, and document ids. A minimum document score variable holds the lowest ranked document score. As each document is scored, it is compared with the minimum document score. If the new document score is less than the minimum document score, the score is discarded. Otherwise, the new document score and document id is placed in the list in the appropriate position, and the minimum document score updated with the lowest score in the list. Once all of the documents have been scored, the list of j (document id, document score) pairs is immediately ready to be returned to the client computer 101. This is the list of documents that locally satisfy the query, given the updated global relative significance of selected terms in the database 103.

The client computer 101 receives from each of the database computers 102 the list of document ids, ranked by their document scores. Since all of the scores are based on a synchronized set of IDFs, they can be immediately merged 321 and re-ranked, without any further processing by the client computer 101. This in effect produces the list of documents that globally satisfy the user's original query. The client computer 101 then displays the list of documents to the user for their further analysis and use.

Those of skill in the art will appreciate that retrieve( ) method thus described passes both the query and the set of (term, global IDF) pairs in order to reduce the number of interactions between the client computer 101 and the various database computers 102, and improve the statelessness of the operations, since these pairs are particular to a specific query by a specific client computer 101, many of which may be served simultaneously. In alternative embodiments the present invention, the database management system 104 would separate these data transfers, with one method passing the (term, global IDF) pairs, which the database computer 102 stores locally, preserving state on them for the particular client computer, and a separate, different retrieve method that merely passes the query, and checks for the presence of global IDFs from the particular client computer 101. In this embodiment then, this retrieve method will also return the documents satisfying the query, using the global relative significance information, as usefully expressed in the global IDFs, to determine the documents that satisfy the query.

In the foregoing first mode of operation in accordance with the present invention, the client computer 101 uses the database computer's analyze( ) method to obtain the first list of terms, from which it selects some number of terms for subsequent synchronization. This step is desirable, but entirely optional. Referring to FIG. 3, in a second mode of operation, the client computer 101, having received the user's query, itself determines and selects 325 the terms to be synchronized. This selection may be based on any of a variety of mechanisms, for example locally stored lists of typically related terms. However selected, these are the terms that are passed to the database computers 102 via the synchronize( ) method. The rest of the operation is as described above.

One of the benefits of the present invention is that no meta-server or query router is required for implementation with the multiple document databases. In some conventional information retrieval systems that operate on multiple document databases, there is provided a query router that manages the query between the client and the database computers 102. Generally, the query router performs the coordination of the various databases, and typically routes the query to the various databases, and then weights the document scores form each database before sending the merged results to the client. In such conventional systems, the query router requires substantial information about each of the document databases, and is intimately involved in the document scoring process. In the present invention, because a query router is not used for weighting results from different document databases, a query may be routed to any or every available host if desired by the client computer 101. This may be quite practical for networks with a fairly small number of document databases 103. On the other hand, if there are many document databases 103, a query router can be used merely to select a subset of the document databases as prime candidates for processing the query.

Figure 6:
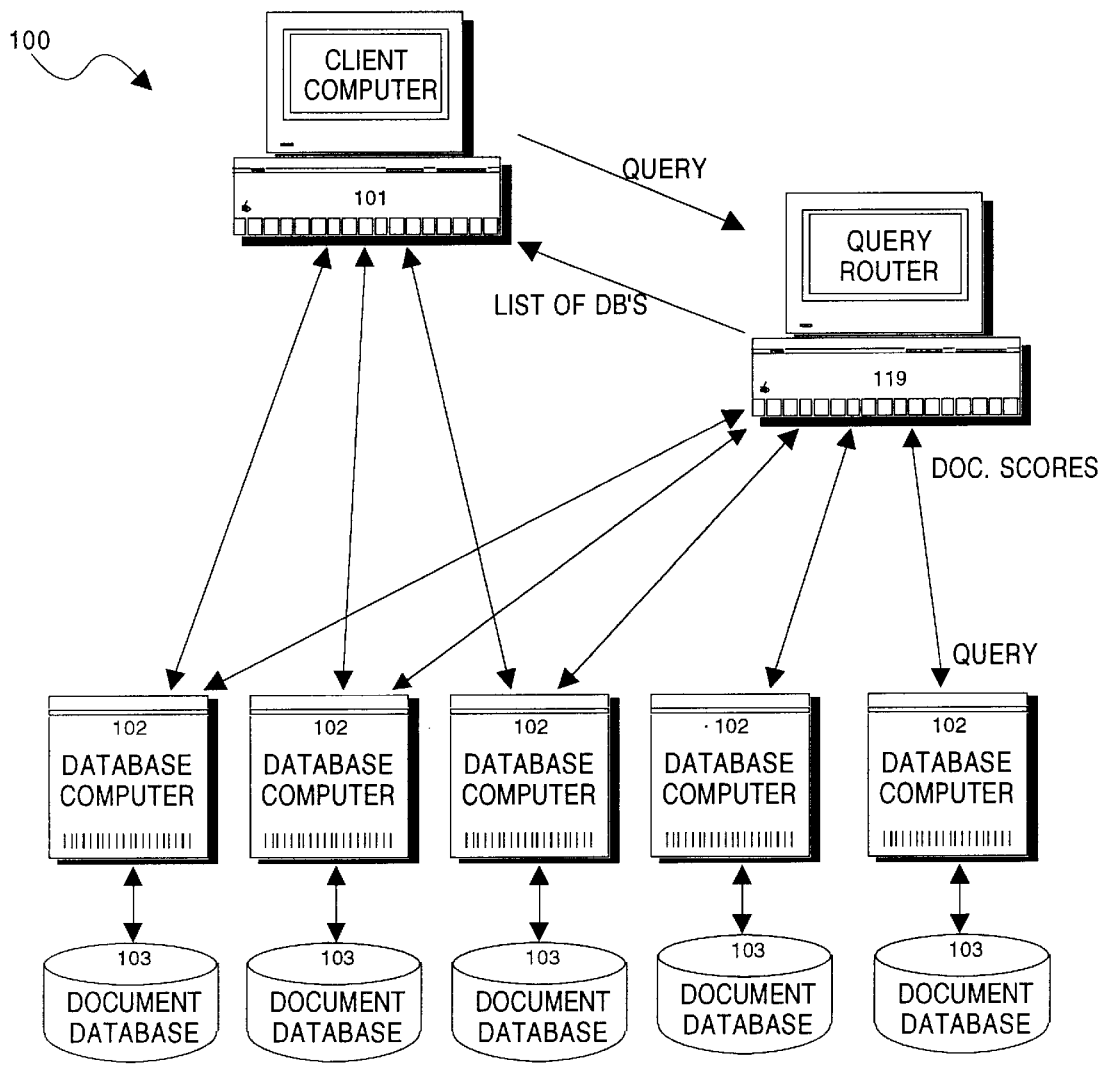
FIG. 6 is an illustration of a distribution information retrieval system using a query router in accordance with the present invention.

FIG. 6 illustrates this use of query router 119 in conjunction with the present invention. This is done by having the client computer 101 initially direct the user's query to the query router 119. The query router 119 then communicates with all of the database computers 102 and determines which of document databases 103 have documents relevant to the query. Alternatively, the query router 119 may collect, prior to the query, information about each of the document database 103 as to which terms are in the various databases 103, without necessarily indexing the document databases 103; from this information the query router 119 can determine which databases 103 are relevant to the query. The query router 119 provides this list of databases to the client computer 101. The query router 119 makes this determination by passing the user's query to the database computers 102, and obtaining their individual query results by way of document scores. The databases 103 that have high scoring documents are those that will be further processed in the above described manner by the client computer 101. FIG. 6 illustrates this aspect by the client computer 101 interfacing with only three of the database computers 102 to obtain global results for the query. In this instance, "global" means with respect to just those databases 103 that are queried, and not every possible database 103 on the network. Alternatively, the query router 119 can maintain information about the total number of documents N in each database 103, whether queried or not, and provide this to the client computer 101; from this information the client computer 101 can compute global IDFs over the either network. In entire case, the query router 119 requires very little information about each document database 103, since it is only used for routing, not for computing scores.

Figure 7:
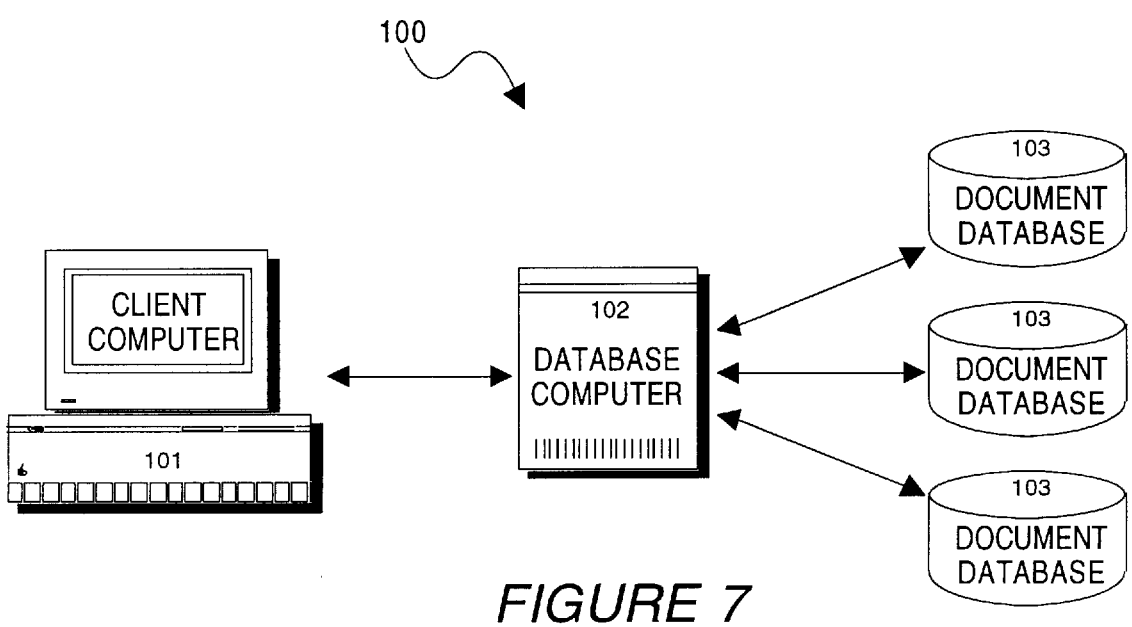
FIG. 7 is an illustration of another system in accordance with the present invention with distributed document databases co-located with respect to a same database computer.

In the foregoing description of the invention, the document databases 103 are generally described as operating on physically distinct database computers 102, for example as shown in FIG. 1. This corresponds to typical implementation of many document databases 103 on different database computers 102 distributed across the Internet. However, the present invention does not require the physical dislocation for the document databases. Multiple document databases 103 can be co-located on a same physical machine, managed by a single database computer 102. FIG. 7 illustrates this implementation. Here, the system 100 comprises a client computer 101 communicatively coupled to a database computer 102 supporting multiple document databases 103. These databases 103 are distributed in the sense that they are logically independent, and constructed with individual, unrelated document collections, document vectors, inverted indices, and the like, even if managed by a same database management system 104 on the database computer. This is a common arrangement in corporate databases, where a single database management system is used to manage multiple, different document databases 103. Thus, the only requirement for distributed databases in the context of the present invention is the logical independence of their inverted indices or other indexing information.

I claim:

1. In an information retrieval apparatus including a database of documents, each document having a plurality of terms and a unique document indicia, the information retrieval apparatus further including a programmed processor adapted to receive a query containing at least one term and to compute in response to the query a document score for each of a selected plurality of documents, the document score being a function of the terms of the query, a computer memory readable by the processor and comprising:

a first table that specifies for each document in the database a set of terms, each term in the set associated with a scalar measure of a contribution the term makes to the document score of the document, the scalar measure of contribution for a term being a function of an inverse document frequency of the term, and a frequency of the term within the document, the terms in each set ordered by the scalar measure of contribution, the sets ordered with respect to indicia of the documents, such that the information retrieval apparatus can determine for any document a selected number of terms that most significantly contribute to the document score.

2. The computer readable memory of claim 1 wherein the error contribution weight for a term T is determined by the formula:

$$E_T = W_T \sum_D \frac{IDF_T TF_{D,T}}{k_D}$$

where:

D iterates over a set of documents containing the term;
$W_T$ is a weighting factoring for term T;
$IDF_T$ is an inverse document frequency value determined as a function of the frequency of term T in the database;
$TF_{D,T}$ is a within-document frequency value determined as a function of the frequency of term T in document D; and,
$k_D$ is a normalization factor for a document vector of document D.

3. In an information retrieval apparatus including a database of documents, each document having a plurality of terms and a unique document indicia, the information retrieval apparatus further including a programmed processor adapted to receive a query containing at least one term and to compute in response to the query a document score for each of a selected plurality of documents, the document score being a function of the terms of the query, a computer memory readable by the processor and comprising:

a first table that specifies for each document in the database a set of terms, each term in the set associated with a frequency of the term in the document, the terms in each set ordered by a scalar measure of a contribution that each term makes to the document score of the document, the scalar measure of contribution for a term being a function of an inverse document frequency of the term, and a frequency of the term within the document, the sets ordered with respect to indicia of the documents, such that the information retrieval apparatus can determine for any document a selected number of terms that most significantly contribute to the document score by retrieving frequency information from the set of terms for the document and computing the contribution from the frequency information.

4. The computer readable memory of claim 3 wherein the error contribution weight for a term T is determined by the formula:

$$E_T = W_T \sum_D \frac{IDF_T TF_{D,T}}{k_D}$$

where:

D iterates over a set of documents containing the term;
$W_T$ is a weighting factoring for term T;
$IDF_T$ is an inverse document frequency value determined as a function of the frequency of term T in the database;
$TF_{D,T}$ is a within-document frequency value determined as a function of the frequency of term T in document D; and,
$k_D$ is a normalization factor for a document vector of document D.

5. In a computer that is communicatively coupled to a plurality of databases, each database maintaining a set of documents arranged and indexed independently of the other databases, each term having a local relative significance within each database that is independent of the local relative significance of the term in the other databases, a computer memory readable by a processing device of the computer and configuring and controlling the processing device to perform the steps of:

requesting from each of the databases for each of a first list of terms, including terms of the query, the local relative significance of the term in the database;

combining the first lists of terms from the databases, and determining for each of the terms a global relative significance of the term from the local relative significance of the term in each of the databases;

receiving from each of the databases a local search result of documents locally satisfying the query executed on the database using the determined global relative significance of selected terms in place of the local relative significance of the selected terms in that database; and combining the local search results into a global search to produce the list of documents satisfying the query with respect to the multiple databases.

6. A computer implemented method of querying multiple databases with a query having at least one term to produce a list of documents from all of the databases that satisfy the query, each term having a total frequency in each database, each database having a total number of documents and an independently determined inverse document frequency value (IDF) for each unique term in the database, the IDF being a function of a number of documents in the database including the term, the method comprising:

requesting from each of the databases the total frequency of each of a first list of terms, and determining therefrom a global frequency for each of the first list of terms;

determining a global number of documents in all of the databases from the total number of documents in each database;

in each database computing a global IDF for each term of the query from the global frequency of each term, and the global number of documents, and executing the query to produce a list of documents in the database that satisfy the query using the global IDFs of the terms of the query; and, merging the lists of documents from the database to produce a list of documents globally satisfying the query with respect to the multiple databases.

7. In a computer that is communicatively coupled to a plurality of databases, each database maintaining a set of documents arranged and indexed independently of the other databases, each term having a local relative significance within each database that is independent of the local relative significance of the term in the other databases, a computer memory readable by a processing device of the computer and configuring and controlling the processing device to perform the steps of:

requesting from each of the databases the local IDF of each of a first list of terms, and determining therefrom a global IDF for each of the first list of terms, the global IDF of a term being a function of a total number of documents in all of the databases, and total number of documents containing the term;

receiving from each database a list of documents in the database that satisfy the query executed on the database while substituting the global IDFs of at least the terms of the query for the local IDFs of the terms in the database; and, merging the lists of documents from the database to produce a consolidated list of documents globally satisfying the query with respect to the multiple databases.

8. A computer implemented method of querying multiple databases with a query having at least one term to produce a list of documents from all of the databases that satisfy the query, each database maintaining a set of documents arranged and indexed independently of the other databases, each term having a local relative significance within each database that is independent of the local relative significance of the term in the other databases, the method comprising, requesting from each of the databases for each of a first list of terms, including terms of the query, the local relative significance of the term in the database;

combining the first lists of terms from the databases, and determining for each the terms, a global relative significance of the term from the local relative significance of the term in each of the databases;

in each database, after determining the global relative significance of each of the terms, executing the query on the database using the global relative significance of selected terms in place of the local relative significance of the selected terms in that database, to produce a local search result of documents locally satisfying the query;

combining the local search results into a global search result to produce the list of documents globally satisfying the query with respect to the databases.

9. The computer implemented method of claim 8 further comprising a first step of:

requesting from each of the databases the first list of terms.

10. The computer implemented method of claim 9, wherein requesting from each of the databases the first list of terms comprises for each database:

providing the query to the database;

executing the query to obtain a first set of documents locally satisfying the query;

determining from the first set of documents a second list of terms that significantly influence the results of the query as a function of the frequency of the term in each of the first set of documents and the frequency of the term in the database; and, selecting the first list of terms from the second list of terms.

11. The computer implemented method of claim 10, wherein:

determining from the first set of documents therein a second list of terms that significantly influence the results of the query comprises:

accumulating across each of the first set of documents an error contribution weight for selected terms in the first set of documents, the error contribution weight being a function of an inverse document frequency of the term, and a frequency of the term within the document, such that the selected terms form the second list of terms; and, selecting the first list of terms from the second list of terms comprises selecting either:

terms having an error contribution weight greater than a predetermined or adaptively determined threshold value; or, a predetermined or adaptively determined number of terms; or, a predetermined or adaptively determined percentage of the second list of terms.

12. The computer implemented method of claim 11 wherein the error contribution weight for the selected terms is determined by the formula:

$$E_T = W_T \sum_D \frac{IDF_T TF_{D,T}}{k_D}$$

where:

T iterates of the selected terms;

D iterates over the first set of documents;

$W_T$ is a weighting factoring for term T;

$IDF_T$ is an inverse document frequency value determined as a function of the frequency of term T in the database;

$TF_{D,T}$ is a within-document frequency value determined as a function of the frequency of term T in document D; and, $k_D$ is a normalization factor for a document vector of document D.

13. The computer implemented method of claim 9, wherein: each document is represented by a document vector having a vector length; and, requesting from each of the databases the first list of terms, comprises for each database:

i) providing the query to the database;

ii) executing the query to obtain a first set of documents locally satisfying the query;

iii) selecting from the first set of documents a set of highly ranked documents; and, iv) selecting from the set of highly ranked documents terms that significantly contribute to the vector length of the document vector of at least one highly ranked document.

14. The computer implemented method of claim 8, wherein determining for each of the terms a global relative significance of the term from the local relative significance of the term in each of the databases comprises:

determining the global relative significance of a term as a function of;
a combined number of documents in all of the databases; and,
a combined frequency of the term in all of the documents in all of the databases.

15. The computer implemented method of claim 14, wherein the global relative significance of the term, $G_T$ is determined by the formula:

$$G_T = \log\left(\frac{\sum_i N_i}{\sum_i n_{i,T}}\right)$$

where $N_i$ is the number of documents in database i, and $n_{i,T}$ is the number of documents in database i that contain term T.

16. The computer implemented method of claim 8, wherein the global relative significance of the terms is determined by a client computer requesting the query from the databases.

17. The computer implemented method of claim 8, wherein the global relative significance of the terms is determined by the individual databases from a total frequency of each of the significant terms in each of the other databases, and a total number of documents in all of the databases.

18. The computer implemented method of claim 8, wherein the local relative significance of a term in a database is a first inverse document frequency value, and the global relative significance is a second inverse document frequency for the term with respect to all of the databases.

19. The computer implemented method of claim 18, wherein:
each document has a determinable document vector having a vector length as a function of the inverse document frequency of selected terms in the document; and,
executing the query on the database using the global relative significance of selected terms in place of the local relative significance of the selected terms in that database comprises:
replacing the local relative significance of the selected terms with the global relative significance of the selected terms;
for each document that contains at least one of the selected terms having a global relative significance, redetermining the length of the document vector of the document according to the global relative significance of the term; and,
executing the query by scoring and then ranking documents.

20. The computer implemented method of claim 19, wherein the documents containing at least one of the terms having a global relative significance further contain at least one term of the query.

21. The computer implemented method of claim 8, wherein the local relative significance of a term in a database is a total frequency of the term in the database, and the global relative significance of the term is a global frequency of the term with respect to all of the databases.

22. The computer implemented method of claim 21, wherein:
each document has a determinable document vector having a vector length as a function of an inverse document frequency of selected terms in the document; and,
executing the query on the database using the global relative significance of selected terms in place of the local relative significance of the selected terms in that database comprises:
for each selected term, replacing the total frequency of the term with its global frequency in all of the databases and computing a global inverse document frequency for the term from the global frequency and a total number of documents in databases;
for each document that contains at least one of the selected terms having a global inverse document frequency, redetermining the length of the document vector of the document according to the global inverse document frequency of the term; and,
executing the query by scoring and then ranking documents.

23. The computer implemented method of claim 8, wherein at least two of the databases are controlled by two computers physically remote from each other.

24. The computer implemented method of claim 8, wherein at least two of the databases are physically controlled by a single computer and maintain separate index information.

25. The computer implemented method of claim 8, further comprising:
providing the query to a query router;
determining with the query router a selected subset of the databases from which to retrieve documents satisfying the query; and,
wherein said requesting from each of the databases for each of a first list of terms, including terms of the query, the local relative significance of the term in the database, comprises requesting only from the selected subset of databases, such that the resulting list of documents globally satisfies the query with respect to the selected subset of databases.

26. A computer implemented method of querying multiple databases with a query having at least one term to produce a list of documents from all of the databases that satisfy the query, each database having an independently determined inverse document frequency value (IDF) for each unique term in the database, the IDF being a function of a number of documents in the database including the term, the method comprising:
requesting from each of the databases the local IDF of each of a first list of terms, and determining therefrom a global IDF for each of the first list of terms, the global IDF of a term being a function of a total number of documents in all of the databases, and total number of documents containing the term;
in each database, executing the query to produce a list of documents in the database that satisfy the query accounting for the global IDFs of the terms of the query; and,
merging the lists of documents from the database to produce a list of documents globally satisfying the query with respect to the multiple databases.

27. The computer implemented method of claim 26, wherein the first list of terms is determined by:
in each of the databases, executing the query to produce a first set of documents, and selecting from the terms contained in the first set of document, terms for which the IDF contributes more than a threshold amount of error to a document score based on the IDFs of the terms in the document.

28. The computer implemented method of claim 26, wherein the first list of terms is determined by:
in each of the databases, executing the query to produce a first set of documents, and determining for each of selected terms T in the first set of documents an error contribution weight $E_T$:

$$E_T = W_T \sum_D \frac{IDF_T TF_{D,T}}{k_D}$$

where:

D iterates over the first set of documents;

$W_T$ is a weighting factoring for a term T;

$IDF_T$ is an inverse document frequency value determined as a function of the frequency of term T in the database;

$TF_{D,T}$ is a within-document frequency value determined as a function of the frequency of term T in document D;

$k_D$ is a normalization factor for a document vector of document D; and, selecting the first list of terms from the terms T as either:
terms T having an error contribution weight $E_T$ greater than a predetermined or adaptively determined threshold value; or, a predetermined or adaptively determined number of the terms T; or, a predetermined or adaptively determined percentage of the terms T.

29. The computer implemented method of claim 26, wherein the global IDF, $G_T$ is determined by the formula:

$$G_T = \log \left( \frac{\sum_i N_i}{\sum_i n_{i,T}} \right)$$

where $N_i$ is the number of documents in database i, and $n_{i,T}$ is the number of documents in database i that contain term T.

30. The computer implemented method of claim 26, wherein executing the query to produce a list of documents in the database that satisfy the query accounting for the global IDFs of the terms of the query comprises:

for each document containing a term of the query for which there is a global IDF, recomputing a normalization factor of the document based on the global IDFs of the terms of the query; and computing a document score according to the IDFs of the terms of the query and the recomputed normalization factor.

31. A computer readable memory including an application programming interface for a database management system communicatively coupled to a client application and a database of documents, the memory storing:

a first method invocable by the client application that receives from the client application a query containing at least one term, and returns to the client application a list of terms, each of the list of terms contributing to a document score of at least one document satisfying the query;

a second method invocable by the client application that receives from the client application a second list of terms, and returns to the client application for each of the second terms a local relative significance of the term;

a third method invocable by the client application that receives from the client application a query containing at least one term, and that returns to the client application a set of document identifiers of documents satisfying the query executed using a global relative significance of selected terms in place of the local relative significance of the selected terms, the global relative significance of each selected term computed from the local relative significance of the term in each of a plurality of document databases.

32. The computer readable memory of claim 31, wherein the first method:

i) executes the query to obtain a first set of documents locally satisfying the query;

ii) determines from the first set of documents a second list of terms that significantly influence the results of the query as a function of the frequency of the term in each of the first set of documents and the frequency of the term in the database; and iii) selects the list of terms from the second list of terms.

33. The computer readable memory of claim 32, wherein the first method determines from the first set of documents a second list of terms that significantly influence the results of the query by:

accumulating across each of the first set of documents an error contribution weight for selected terms in the first set of documents, the error contribution weight being a function of an inverse document frequency of the term, and a frequency of the term within the document, such that the selected terms form the second list of terms.

34. The computer readable memory of claim 33, wherein the error contribution weight for a term T is determined by the formula:

$$E_T = W_T \sum_D \frac{IDF_T TF_{D,T}}{k_D}$$

where:

D iterates over the first set of documents;

$W_T$ is a weighting factoring for term T;

$IDF_T$ is an inverse document frequency value determined as a function of the frequency of term T in the database;

$TF_{D,T}$ is a within-document frequency value determined as a function of the frequency of term T in document D; and, $k_D$ is a normalization factor for a document vector of document D.

35. The computer readable memory of claim 31, wherein the third method further receives a list of terms, each term associated with a global relative significance.

36. The computer readable memory of claim 35 wherein the global relative significance is a global frequency of the term with respect to all of the databases.

37. The computer readable memory of claim 35 wherein the global relative significance is a global inverse document frequency of the term with respect to all of the databases.

38. The computer readable memory of claim 31, wherein the third method:

scores each document that contains at least term of the query having a global relative significance by redetermining a length of the document vector of the document according to the global relative significance of the term, and computing a document score as a function the redetermined vector length.

* * * * *

UNITED STATES PATENT AND TRADEMARK OFFICE
CERTIFICATE OF CORRECTION

PATENT NO.: 5,826,261

DATED: October 20, 1998

INVENTOR: Graham Spencer

It is certified that errors appear in the above-identified patent and that said Letters Patent is hereby corrected as shown below:

Column 3, line 55, replace "$IDF_Q$" with --$IDF_q$--.

Column 14, line 61, replace "document amongst" with --documents amongst--.

Signed and Sealed this

Sixth Day of April, 1999

*Attest:*

Q. TODD DICKINSON

*Attesting Officer*   Acting Commissioner of Patents and Trademarks